Sept. 20, 1949.   J. A. BASCLE   2,482,313
HYDRAULIC CLUTCH

Filed April 10, 1947   4 Sheets-Sheet 1

INVENTOR.
Joseph Albon Bascle
BY
Wilkinson & Mawhinney
Attorneys

Sept. 20, 1949.   J. A. BASCLE   2,482,313
HYDRAULIC CLUTCH

Filed April 10, 1947   4 Sheets-Sheet 3

INVENTOR.
Joseph Albon Bascle
BY
Wilkinson & Mawhinney
Attorneys

Sept. 20, 1949.  J. A. BASCLE  2,482,313
HYDRAULIC CLUTCH
Filed April 10, 1947  4 Sheets-Sheet 4
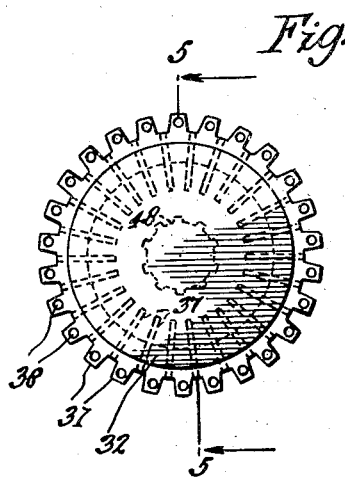
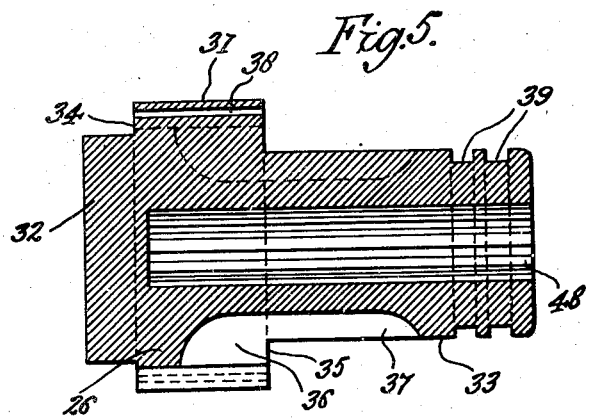
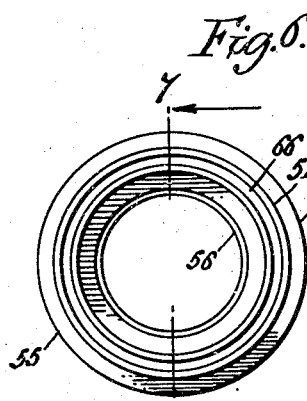
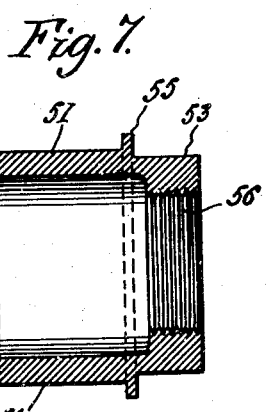
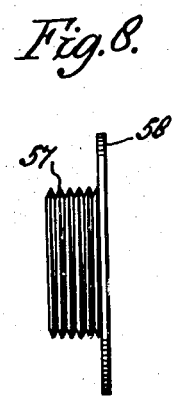
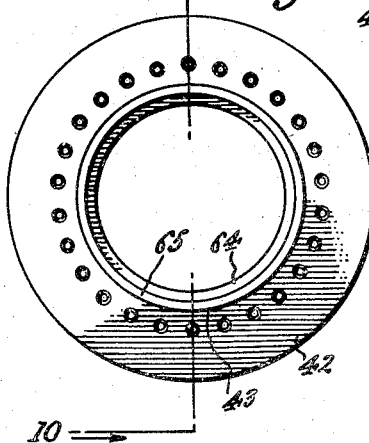
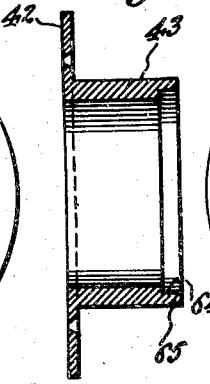
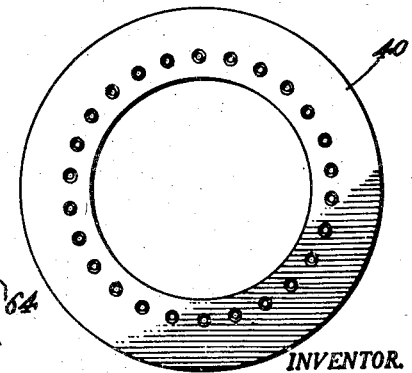
INVENTOR.
Joseph Alban Bascle
BY
Wilkinson & Mawhinney
Attorneys Patented Sept. 20, 1949

2,482,313

UNITED STATES PATENT OFFICE 2,482,313

HYDRAULIC CLUTCH

Joseph Albon Bascle, New Orleans, La., assignor, by mesne assignments, to John G. Sloat and Joe J. Sloat, both of Slidell, La.

Application April 10, 1947, Serial No. 740,615

8 Claims. (Cl. 192—61)

The present invention relates to improvements in hydraulic clutch and more particularly refers to a combined transmission and clutch of the constantly meshed gear type.

An object of the invention is to provide a combined clutch and transmission for use with a power means, such as an internal combustion engine in a motor vehicle, or for use wherever a transfer of power is desired.

Another object of the invention is to provide a combined clutch and transmission so constructed and arranged as to eliminate the necessity of changing gears, the speed ratio of the driven element with respect to the driving element being effected in a smooth manner through the use of a changeable clutching device.

Another object of the invention is to provide a combined clutch and transmission capable of being incorporated in a flywheel, and wherein the flywheel constitutes an important element in the effectiveness of the device.

A further object of the invention resides in the provision of a hydraulic means for effecting a change in the speed ratio between the driven and the driving elements.

A still further object of the invention is in the provision of a means in combination with the flywheel of the engine or motor whereby the hydraulic system is maintained in a filled condition at all times.

A still further object of the invention resides in the attachment of rotating flanges to the ends of the gear wheels to aid in sealing the fluid with minimum reliance on the housing devices.

A still further object of the invention is to provide a milled control gear so as to provide a controllable outlet through the center gear.

A still further object of the invention is to provide a cooling shroud to direct the flow of fluid to the proper inlets and at the same time to furnish a cooling means.

A still further object of the invention is to provide a novel design which will allow maximum use of lightweight alloys in the construction and particularly the use of gear material and gear-housing material having cooperative expansion qualities best suited to the maintenance of close clearances under normal operating temperatures.

With the foregoing and other objects in view, the invention will be more fully described hereinafter and more particularly pointed out in the appended claims.

In the drawings, in which like parts are denoted by the same reference characters throughout the several views.

Figure 4 is an end elevation of the central or hub gear taken from the left end of Figure 5;

Figure 5 is a longitudinal section taken through the central or hub gear on the line 5—5 in Figure 4.

Figure 6 is an end view of a form of control element or sleeve employed and taken from the left end of Figure 7;

Figure 7 is a longitudinal section through the same taken on the line 7—7 in Figure 6;

Figure 8 is a side elevational view of a form of collar employed with the sliding sleeve shown in Figure 7;

Figure 9 is an end view of a flange and collar taken from the left end of Figure 10;

Figure 10 is a longitudinal section taken on the line 10—10 in Figure 9; and

Figure 11 is an end elevation of a disc flange which complements the flange of Figures 9 and 10.

Figure 1:
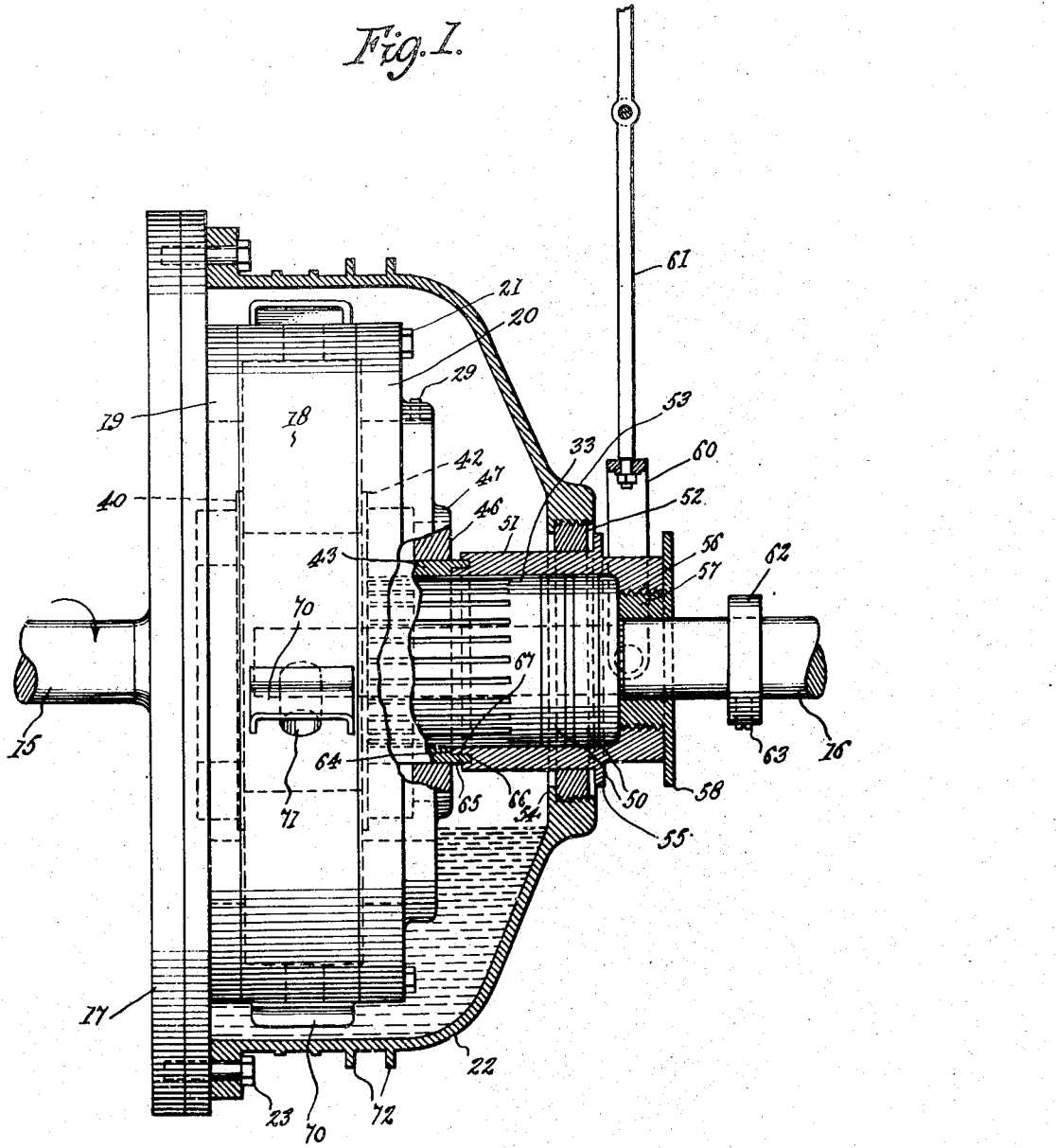
Figure 1 is a side elevation, with parts broken away and with parts shown in section, of an improved hydraulic clutch constructed according to the present invention with the control element in its innermost position.

Referring more particularly to the drawings 15 designates a drive shaft and 16 a driven shaft with preferably a flywheel construction interposed between the two shafts and connected to be driven fixedly from the drive shaft 15. The improved fluid or hydraulic transmission and clutch may be, and preferably is, built into or carried by said flywheel. This flywheel is designated generally at 17 and may be of conventional form. A gear housing 18 has through cylindrical openings to accommodate rotating gears and the ends of these openings are closed by end heads or plates 19 and 20. Bolts or other fastenings 21 pass through the heads 19 and 20 and through the housing or casting 18 and are threaded into a part of the flywheel construction whereby such housing and its end heads are carried by and rotate with such flywheel. The forward end head 19 constitutes a driving plate for the unit which is the housing and its gear assembly. This forward or inner driving plate or head 19 is properly machined to fit the corresponding flywheel surfaces on one side and corresponding surfaces for the housing 18 which constitutes the gear carrier on the other side. In like manner the outer or gear cover plate or head 20 may be machined to fit outside the rear contacting surfaces of the gear housing or carrier 18.

A shroud or outer casing 22 is removably or otherwise attached to the flywheel and envelops the gear housing. It may be attached to the flywheel in any appropriate manner as by the use of bolts or other fastenings 23. This casing or shroud 22 contains a body of oil or other desired liquid which constitutes the medium for controlling the variable speeds at which the driven shaft 16 may be rotated.

Figure 2:
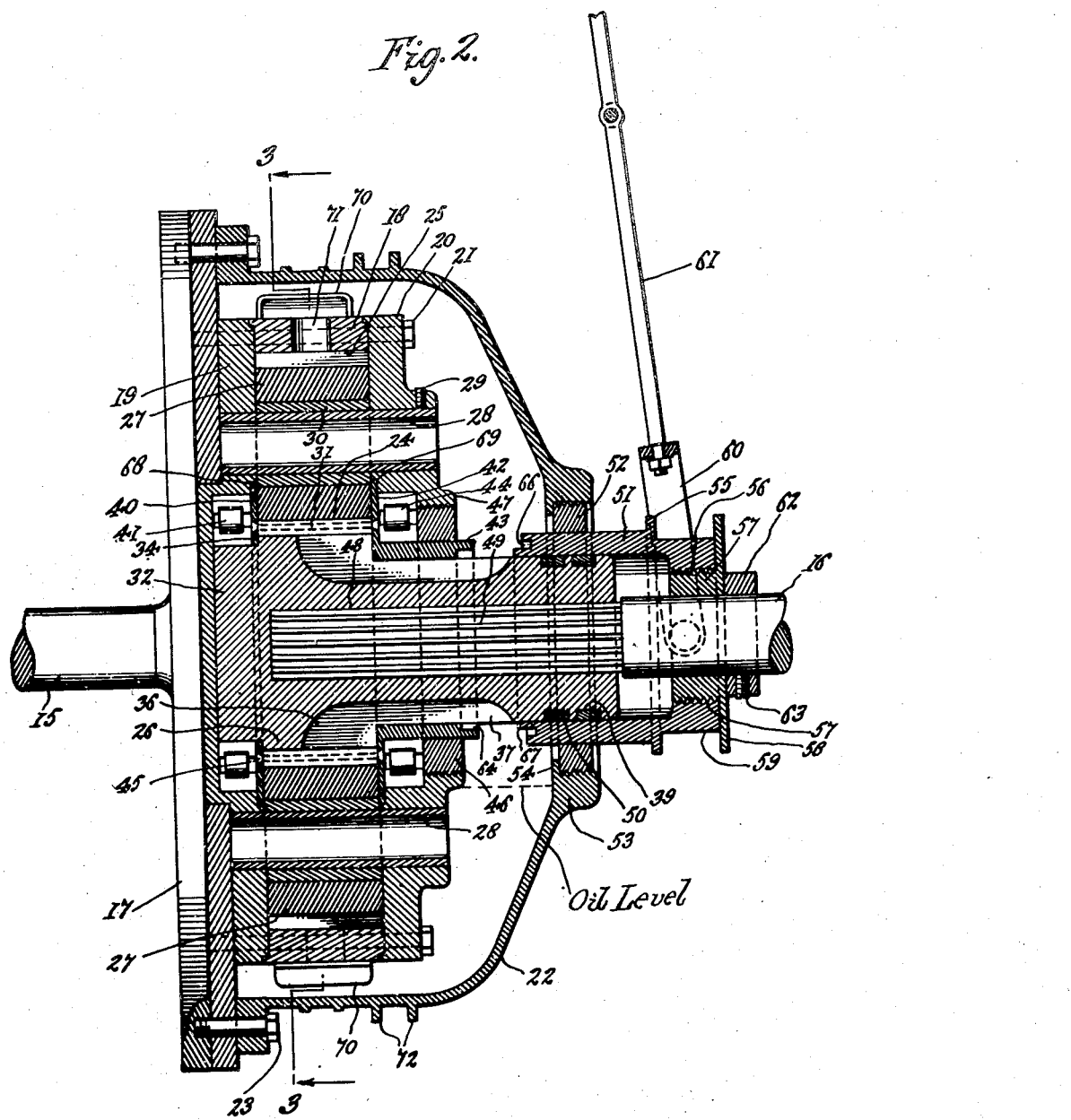
Figure 2 is a vertical central longitudinal section taken through the improved clutch with the control element shown in the outer position.
Figure 3:
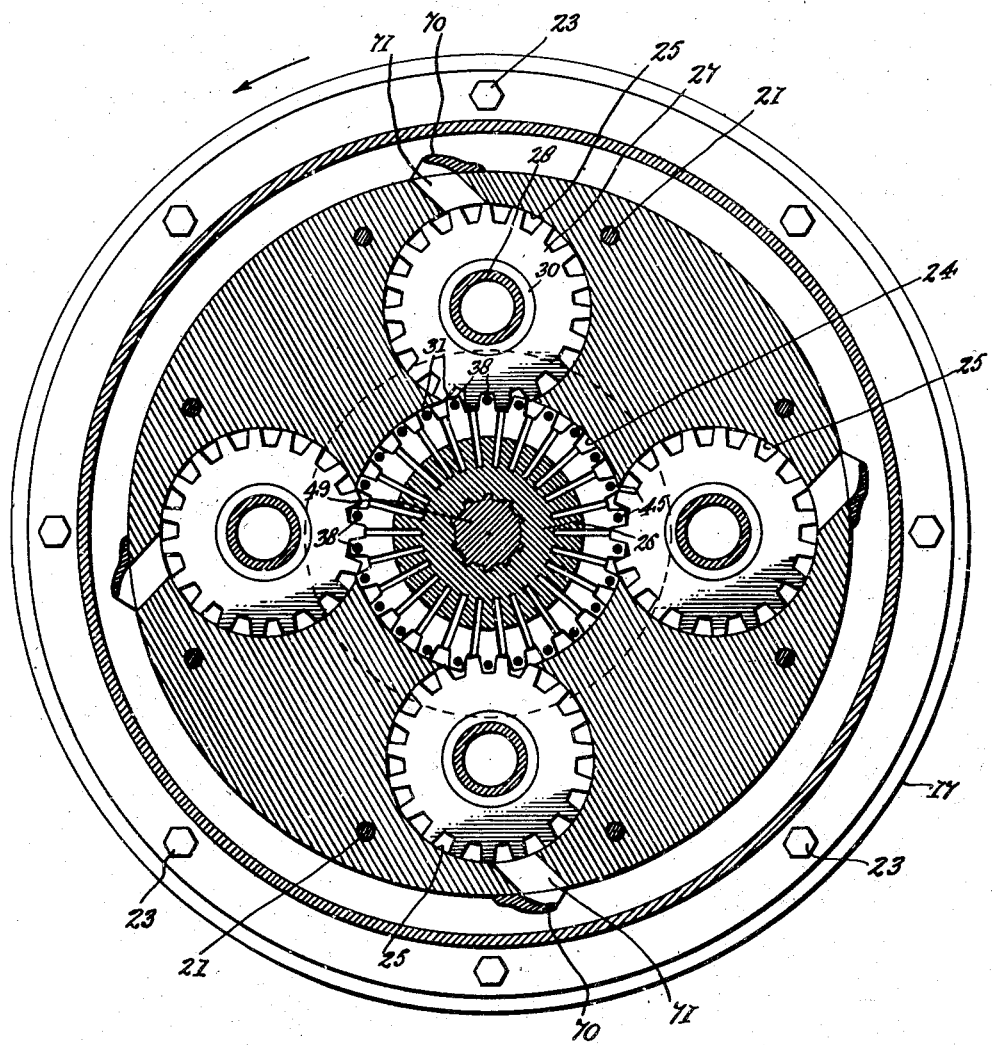
Figure 3 is a transverse vertical section taken on the line 3—3 in Figure 2.

As shown more particularly in Figure 3 the bores or cylinders made transversely through the gear housing 18 are preferably five in number and constitute a central bore 24 and four outer bores 25. These bores house a central hub gear 26, shown more particularly in Figures 4 and 5, and the four outer gears 27 shown more particularly in Figures 2 and 3. These bores are accurately machined and allow a minimum working clearance between their walls and the gears suspended therein. The end heads or plates 19 and 20 are additionally machined throughout bearing surfaces in which are mounted the ends of the hardened trunnion pins 28 on which the outer gears 27 are rotatably mounted. The trunnions 28 themselves are preferably non-rotatable, being held against movement by set screws in the outer head or plate 20. Suitable bearing sleeves 30 are carried by the outer gears 27 and rotate upon the intermediate portions of the trunnion pins 28. The outer bores or cylinders communicate with the central bore or cylinder 24 in order that the teeth of the gears 26 and 27 may be meshed with one another.

Referring more particularly to Figures 4 and 5, the central hub gear 26 embodies a toothed section 31 situated between a reduced inner and end trunnion 32 and an outer barrel section 33. Shoulders 34 and 35 result from the stepped down construction. Hydraulic grooves are made in both the toothed section 26 and the barrel section 33 and comprise radial portions 36 and axial portions 37. The radial grooves 36 are disposed between adjacent teeth of the toothed section 31 which arrangement is best illustrated in Figure 4. These hydraulic grooves are separated from one another circumferentially. The teeth 31 are traversed by openings 38 and ring grooves 39 are made in the innermost portion of the barrel 33.

Referring more particularly to Figure 2 it will be seen that a disc flange 40 is slidably fitted over the external smooth surface of the inner trunnion 32 of the central hub gear and is adapted to rest against the shoulder 34 being, however, of greater diameter than such shoulder 34. The remainder of the trunnion 32 is utilized as a support for the central hub gear at its inner or forward end, this trunnion 32 being mounted in the roller or other bearing 41.

The other shoulder 35 of the hub gear receives thereagainst a companion disc 42 similar to the disc 40. The disc 42, as shown in Figures 9 and 10, may be carried upon the collar 43 mounted over the barrel 33. This collar 43 is externally carried in a roller or other bearing 44, shown in Figure 2. The two discs 40 and 42 constitute a pair of annular flanges which outstand from the gear teeth 31 and overlap the gear teeth of the outer gears 27. Rivets 45 or other fastenings may be used to bind the two flanges 40, 42 together, such rivets passing through the openings 38 in the gear teeth portion of the central hub gear 26. It will be noted particularly from Figure 2 that the collar 43 is of less axial length than the axial portions 37 of the hydraulic grooves in the central gear hub 33 to provide a discharge mouth from the groove portions 37 outwardly beyond the outer end of the hub 43 and into the internal space of the outer casing or shroud 22. An oil ring or closure 46 is threaded or otherwise mounted in the central opening of the outer cover plate 20 and snugly engages the outer portion of the collar 43. This ring also forms an outer abutment for the roller bearing 44 which is seated between this ring 46, the flange 42, the collar 43 and the plate or cover 20; the ring 46 being secured in an offset 47 of such cover 20.

The barrel portion 33 of the central hub gear 26 is provided with a splined bore 48 to receive the splined end 49 of the driven shaft 16.

In the ring grooves 39 of the barrel 33 are mounted the packing or oil rings 50 which bear against the inner cylindrical surface of a control sleeve 51 which is slidable axially along the outer barrel section 33 and into the interior of the casing 22 through an oil ring or packing member 52 which is threaded or otherwise removably secured in the inner narrow end 53 of the casing or shroud 22, such inner end preferably having an inwardly extending flange 54 for the ring 52 to take against in its home position.

The sleeve 51 is shown more particularly in Figures 6 and 8 as having an outstanding flange 55 and an internal threaded bore 56 adapted to receive the externally threaded collar 57 carrying a companion flange 58 which also acts as a shoulder to engage the inner end of the sleeve 51 to arrest the collar 57 on its inward rotary motion. The flange 58 is of a diameter to extend outwardly beyond the external surface of the sleeve 51 in spaced relation to the flange 55 to constitute an annular channel 59 engaged by the claw 60 of a control shift lever 61. A set collar 62 having a set screw 63 may be fitted to the driven shaft 16 firmly up against the flange 58.

It will be noted that the oil passages 36 and 37 in the central hub gear 26 extend downwards and outwards to form independent oil passages. These passages do not connect with each other, nor do they extend the full length of the meshing gears on the forward end 31 of the hub gear. These passages are preferably milled in the hub gear.

The rotating flanges 40 and 42 will preferably be precision ground to fit on the inner and outer ends of the hub gear 26. When riveted in proper position these flanges form a means whereby the fluid is trapped at the ends of the meshing gear teeth. Such flanges fully provide an overlapping sealing means independently of the housing plate 19 and bore covering plate 20. The inner end of the collar 43 is cut away at 64 to form a narrow tongue 65 adapted to fit into an annular groove 66 which is disposed outwardly of a projecting tongue 67 positioned to simultaneously enter the cut away portion 64. These mating ends are shown in Figure 1 to be interlocked when the speed controlling sleeve 51 is moved to its innermost position.

The axial central bore 24 in the housing or gear carrier 18 is fitted with close clearance limits to the teeth 31 of the hub gear 26. The bores 25 for the outer gears 27 are also preferably precision ground to minimum operating clearance as are also the bearing inserts 30. The hub gear together with the four outer gears form a battery of positive rotary-type pumps to effectively transfer fluid with the least possibility of heat generation and leakage.

The plates or heads 19 and 20 are formed with cut-out portions 68 and 69 to receive the outer free edges of the flanges 40 and 42.

The external gears 27 are first entered into their respective bores in the gear carrier 18 and thereafter the central hub gear 26 is fitted into place. It is to be noted that the rotating flanges 40 and 42 overlap the central longitudinal bore 24 and it is therefore necessary to install these rotating flanges after the hub gear is positioned within the central bore of the gear carrier 18. After the central hub gear 26 is positioned, the rotating flanges 40 and 42 are pressed over their respective hub gear ends and are then anchored to the hub gear by means of the rivets or countersunk studs 45.

The central gear carrier 18 is also provided with oil inlet scoops 70 and oil channels 71. There are as many scoops 70 and oil channels 71 as there are outer gears 27 and the channels communicate with the outer gear bores 25 at portions thereof which are preferably substantially diametrically opposite the zones where the teeth of these outer gears mesh with the teeth of the hub gear.

The shroud or outer casing 22 is provided with external air cooling fins 72. A body of oil or other fluid is placed in the shroud or outer casing 22 up to the level indicated in Figure 2 and the casing thus acts as a fluid reservoir to supply the gear train.

In operation, viewed from Figure 3, the engine drives the parts in a counterclockwise direction as indicated by the arrow and the centrifugal force throws the oil outwardly to form an annular body to the outer cylindrical and finned portion of the shroud or casing 22 where such oil annulus envelops the outer portion of the housing or gear carrier 18 which carries the scoops 70. These scoops 70 are presented in a way to induce the entrance of the oil to the channels 71 and to the outside gears 27. With this condition thus created the oil channels 71 and the scoops 70 are charged with fluid and the pumping action of the gears takes place.

In Figure 1 the speed control sleeve 51 is shown in the fully forward or closed position. In this position the oil is positively restricted and therefore a direct drive is accomplished. In Figure 2 the speed control sleeve 51 is shown in the most rearward position or open position. At this position the oil may discharge freely between the now separated mating ends of the collar 43 and sleeve 51; and therefore a de-clutched effect or neutral position is obtained.

Inasmuch as the degree of restriction taking place between the fully opened and fully closed positions will cause a braking action on the central hub gear, it will be apparent that any ratio desired may be accomplished simply by selecting the position of the speed controlling sleeve 51.

It is obvious that various changes and modifications may be made in the details of construction and design of the above specifically described embodiment of this invention without departing from the spirit thereof, such changes and modifications being restricted only by the scope of the following claims.

What I claim is:

1. A hydraulic clutch comprising a rotor having central and side bores, central and side gears mounted for rotation in the respective bores and having teeth meshed together, said rotor having a duct leading to the enmeshed teeth, drive and driven members fast to said rotor and central gear, a liquid supply to said duct, said central gear having liquid exhaust passages opening to the enmeshed teeth and to the liquid supply, said exhaust passages being individual and separated by the teeth of the central gear at their entrance mouths, said exhaust passages having portions which are radial and portions which are axial of the central gear, and means to control the port area of the exhaust passages comprising a collar axially offset both from the radial portions of the exhaust passages and from the exhaust mouths of the passages, and a control sleeve slidably mounted on the central gear and adapted to engage against the collar to close the exhaust mouths of the passages.

2. A hydraulic clutch according to claim 1 in which the adjacent ends of the collar and sleeve are formed with complementary tongue and groove.

3. A hydraulic clutch according to claim 1 in which said central gear has a trunnion, a gear section and a barrel section with shoulders on opposite sides of the gear section, a bearing for the trunnion, a disc removably mounted on the trunnion and between the shoulder and bearing and overlapping the enmeshed teeth, a flange on the collar engaging the other shoulder and overlapping the enmeshed teeth at the opposite side of the gears from said disc, and a bearing engaging the flange and collar.

4. A hydraulic clutch according to claim 3 characterized by the fact that a ring removably mounted in the rotor confines the last mentioned bearing against said flange and extends about said collar.

5. A hydraulic clutch according to claim 4 characterized by the fact that the bores in the rotor are closed by a cover secured to and forming part of the rotor and in which said ring is threadedly mounted.

6. A hydraulic clutch comprising a rotor having central and side bores, central and side gears mounted for rotation in the respective bores and having teeth meshed together, drive and driven members fast to said rotor and central gear, said rotor having a duct leading to the enmeshed teeth, a liquid supply to said duct, said central gear having liquid exhaust passages opening to the enmeshed teeth and to the liquid supply, said exhaust passages having portions which are radial of the central gear in communication with the enmeshed teeth and also having portions axial of the central gear with discharge mouths connecting with the liquid supply, a collar carried by the rotor and lying between the radial portions of the exhaust passages and the discharge mouths thereof and extending in spaced relation about the intermediate portions of such exhaust passages, and a control sleeve slidably mounted relatively to the central gear and adapted to engage against the collar across the discharge mouths of the exhaust passages.

7. A hydraulic clutch comprising a rotor having central and side bores, central and side gears mounted for rotation in the respective bores and having teeth meshed together, drive and driven members fast to said rotor and central gear, said rotor having a duct leading to the enmeshed teeth, a liquid supply to said duct, said central gear having a liquid exhaust passage comprising radially, intermediate and discharge mouth portions, said radial portion communicating with the enmeshed teeth and with the intermediate portions, a collar on the rotor extending about the intermediate portion of said liquid exhaust passage and spaced axially from the radial portion and the discharge mouth, said discharge mouth communicating with the liquid supply, and a control member for moving to and from said collar across the discharge mouth to regulate the port area of such mouth.

8. A hydraulic clutch according to claim 7 in which the liquid supply is formed by a body of liquid contained in a case spaced from the rotor both circumferentially and forwardly to provide a circumferential space in communication with said duct and a forward space in communication with the circumferential space and with the discharge mouth of the exhaust passage, said case having a forward wall inclining toward the circumferential space to lead the discharge liquid from the discharge mouth to the duct, said wall having a bearing through which the control member is adapted to slide.

JOSEPH ALBON BASCLE.

REFERENCES CITED

The following references are of record in the file of this patent:

UNITED STATES PATENTS

| Number | Name | Date |
| --- | --- | --- |
| 986,830 | Keefer | Mar. 14, 1911 |
| 1,418,126 | Cartlidge | May 30, 1922 |
| 1,954,418 | Ley | Apr. 10, 1934 |
| 2,193,806 | De Vore | Mar. 19, 1940 |
| 2,329,230 | Thomas | Sept. 14, 1943 |
| 2,418,625 | Cornelius | Apr. 8, 1947 |